United States Patent
Stagg et al.

(10) Patent No.: US 6,792,650 B2
(45) Date of Patent: Sep. 21, 2004

(54) HIGH RETENTION FORCE ANTI-LOCK BRAKE SENSOR CLIP

(75) Inventors: Michael E. Stagg, Huntington, IN (US); Thasin A. Sayeed, Fort Wayne, IN (US); Richard R. Rowan, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 133 days.

(21) Appl. No.: 10/212,412

(22) Filed: Aug. 5, 2002

(65) Prior Publication Data

US 2003/0047014 A1 Mar. 13, 2003

Related U.S. Application Data

(62) Division of application No. 09/542,136, filed on Apr. 4, 2000, now Pat. No. 6,463,818.

(51) Int. Cl.$^7$ .............................. F16L 5/00; H02G 3/22
(52) U.S. Cl. ........................................................ 16/2.1
(58) Field of Search ............................ 16/2.1, 2.2, 2.3; 400/354, 352; 267/292, 293, 140, 140.11; 248/56, 634, 635; 174/76, 77 R, 85, 91, 92; 384/276, 273, 295; 74/535–538, 529, 562

(56) References Cited

U.S. PATENT DOCUMENTS

| | | | | |
|---|---|---|---|---|
| 3,836,698 A | * | 9/1974 | Bawa | 174/83 |
| 3,917,418 A | * | 11/1975 | Lanoie | 401/116 |
| 4,196,944 A | * | 4/1980 | Simatovich | 384/49 |
| 4,269,550 A | * | 5/1981 | DiGiulio | 408/241 B |
| 4,610,589 A | * | 9/1986 | Bredal | 411/180 |
| 4,667,943 A | * | 5/1987 | Izumi et al. | 267/141.3 |
| 4,752,652 A | * | 6/1988 | Danti et al. | 174/83 |
| 4,896,892 A | * | 1/1990 | Andrews | 279/46.5 |
| 5,212,984 A | * | 5/1993 | Norling et al. | 73/493 |
| 5,236,080 A | * | 8/1993 | Baum et al. | 198/845 |
| 5,470,165 A | * | 11/1995 | Bissinger | 403/313 |
| 5,630,519 A | * | 5/1997 | Burke et al. | 213/155 |
| 5,788,903 A | * | 8/1998 | Allgaier | 264/219 |
| 5,988,614 A | * | 11/1999 | Sturmon | 267/292 |
| 6,080,933 A | * | 6/2000 | Gretz | 174/65 R |

FOREIGN PATENT DOCUMENTS

DE 3221835 A * 1/1984 .......... A61B/17/18

\* cited by examiner

Primary Examiner—Chuck Y. Mah
(74) Attorney, Agent, or Firm—Jeffrey P. Calfa; Dennis Kelly Sullivan; Susan L. Lukasik

(57) ABSTRACT

The invention provides a bushing for insertion into a cylindrical aperture defined by a mounting bracket. The bushing further provides for retention of a cylindrical sensor housing which is enveloped around its circumference by the bushing and positioned adjacent a rotating flux focusing element. The bushing is formed from a sheet of spring metal and shaped into a cylinder. A pair of outwardly projecting retaining brackets extend from a first end of the sheet and are positioned at one end of the cylinder. In addition, a pair of outwardly projecting dimples are formed in the sheet near the edge of the sheet opposite the first edge, the dimples being sized to allow insertion of the bushing into a cylindrical aperture but function to resist extraction for the bushing after passing completely through the cylindrical aperture.

2 Claims, 3 Drawing Sheets

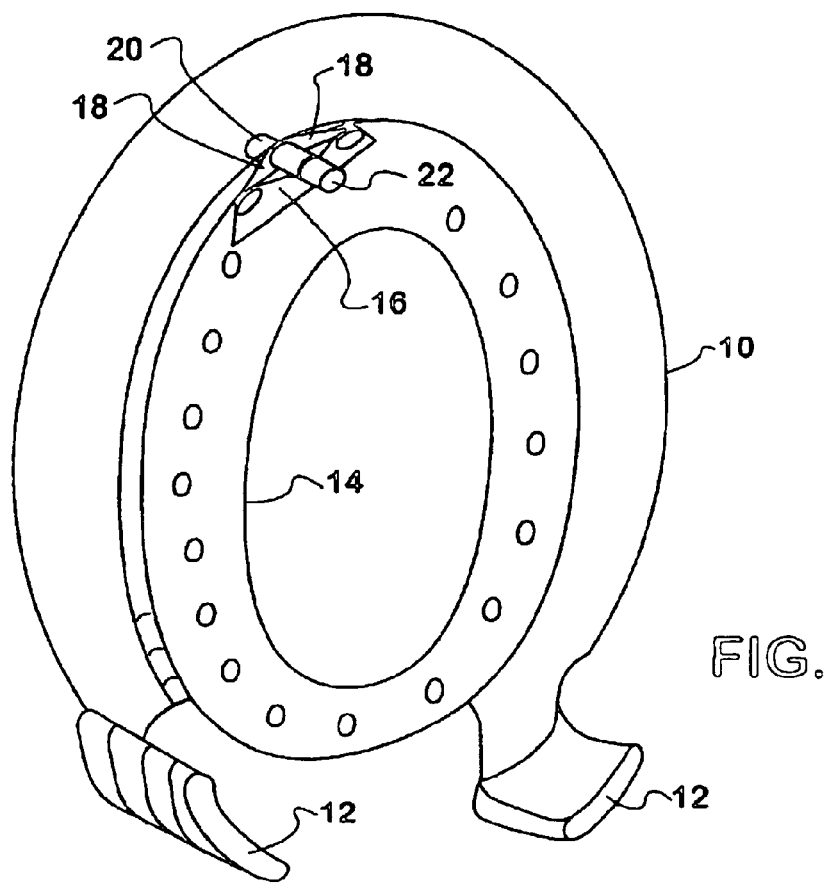
FIG. 1
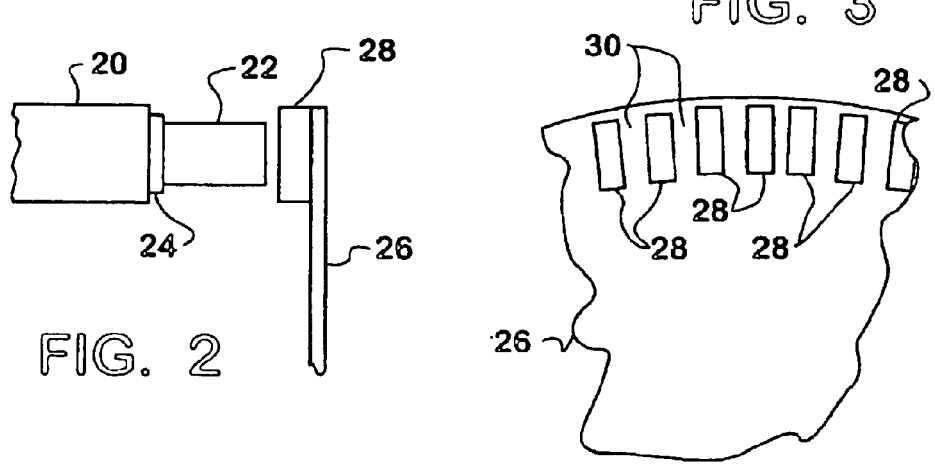
FIG. 2
FIG. 3

HIGH RETENTION FORCE ANTI-LOCK BRAKE SENSOR CLIP

This is a division of application Ser. No. 09/542,136, filed Apr. 4, 2000 now U.S. Pat. No. 6,463,818.

BACKGROUND OF THE INVENTION

1. Field of the Invention

The present invention relates to mounting systems for anti-lock brake sensors.

2. Description of the Prior Art

Electromagnetic sensors are commonly employed in vehicle anti-lock braking systems (ABS) as the basic element used for skid detection. The detection of skids is founded on detecting abrupt changes, particularly an abrupt decline, in the rotational velocity of a wheel. An electromagnetic sensor is used to generate a periodic or oscillating signal indicating the rotational rate of the wheel. Changes in the frequency of the oscillating signal, or the cessation of oscillation, indicate changes in wheel rotational speed.

The sensor cooperates with a disk mounted for rotation with a wheel being monitored. The disk is positioned so that one of its major surfaces faces the sensor, preferably with the sensor being adjacent the outside edge of the plate. Along the exterior edge on the plate face adjacent the sensor are alternating ridges and grooves. A magnet is positioned near the sensor on the opposite side of the disk. As a ridge moves between the magnet and sensor leakage flux is reduced with a consequent effect on the amplitude of the electrical signal produced by the sensor. As gaps between ridges become positioned between the magnet and the sensor the leakage flux increases with a corresponding inverse effect on the amplitude of the sensor output signal. A spinning wheel results in the rapid alternation of gaps and ridges moving between sensor and magnet and result in the sensor generating a signal of oscillating amplitude. When the wheel stops moving, as occurs when it locks up in a skid, the amplitude of the signal stops changing and occurrence of a skid is indicated.

Efficient operation of the sensor requires that the gap between the sensor head and the ridges on the rotating disk be minimized, while still allowing free, non-contacting movement of the wheel and plate. Excessive spacing between ridge and sensor head allows leakage of magnetic flux and, as a result, a signal with a substantially flattened amplitude changes is produced by the sensor in response to rotation of the plate. False indications of wheel lock-up then become possible.

A positioning mount for a skid sensor should keep the sensor in close proximity to the wheel once the sensor has been properly positioned. The mount should also assure ease in construction of the skid detection components with the wheel. Ease in construction is served by making the final assembly tolerant of minor mechanical variations and by making the sensor positionally self adjusting. Contemporary design has achieved the end of making the sensor positionally self adjusting by housing the sensor in an elongated cylindrical tube and then positioning the tube through a circular aperture through a bracket. The sensor housing is retained in the aperture by friction between a spring bushing which lines the interior circular aperture and which wraps around the sensor housing. The bushing should have a sufficient coefficient of friction with the sensor housing to require a minimum force of 25 lbs to move the sensor housing back and forth in the bushing. In assembly a technician can insert the sensor fully into the bracket until a stop on the sensor impinges on the body of the bracket. Then the wheel and plate assembly may be placed on the axle. The disk will come into contact with the sensor housing as the wheel is urged into position, and will force the sensor back to the appropriate position.

When the bushing is properly positioned in the bracket aperture, the bushing generates the required minimum force on the sensor housing automatically. However, in the prior art design problems have arisen with retaining the bushing in the aperture. If the bushing is improperly seated less force may be required to move the sensor.

SUMMARY OF THE INVENTION

The invention provides an improved bushing for insertion into a cylindrical aperture defined by a mounting bracket. The improved bushing provides for retention of a cylindrical sensor housing which is enveloped around its circumference by the bushing and positioned adjacent a rotating flux focusing element. The bushing is formed from a sheet of spring metal and shaped into a cylinder. A pair of outwardly projecting retaining brackets extend from a first end of the sheet and are positioned at one end of the cylinder. In addition, a pair of outwardly projecting dimples are formed in the sheet near the edge of the sheet opposite the first edge, the dimples being sized to allow insertion of the bushing into a cylindrical aperture, but to resist extraction of the bushing after its complete insertion through the cylindrical aperture.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a perspective view of a mounting plate used in a wheel assembly for supporting brake system components;

FIG. 2 is a side view of an anti-lock brake system skid detection subsystem;

FIG. 3 is a front plan view of a section of a flux focusing disk;

DETAILED DESCRIPTION OF THE INVENTION

Figure 4:
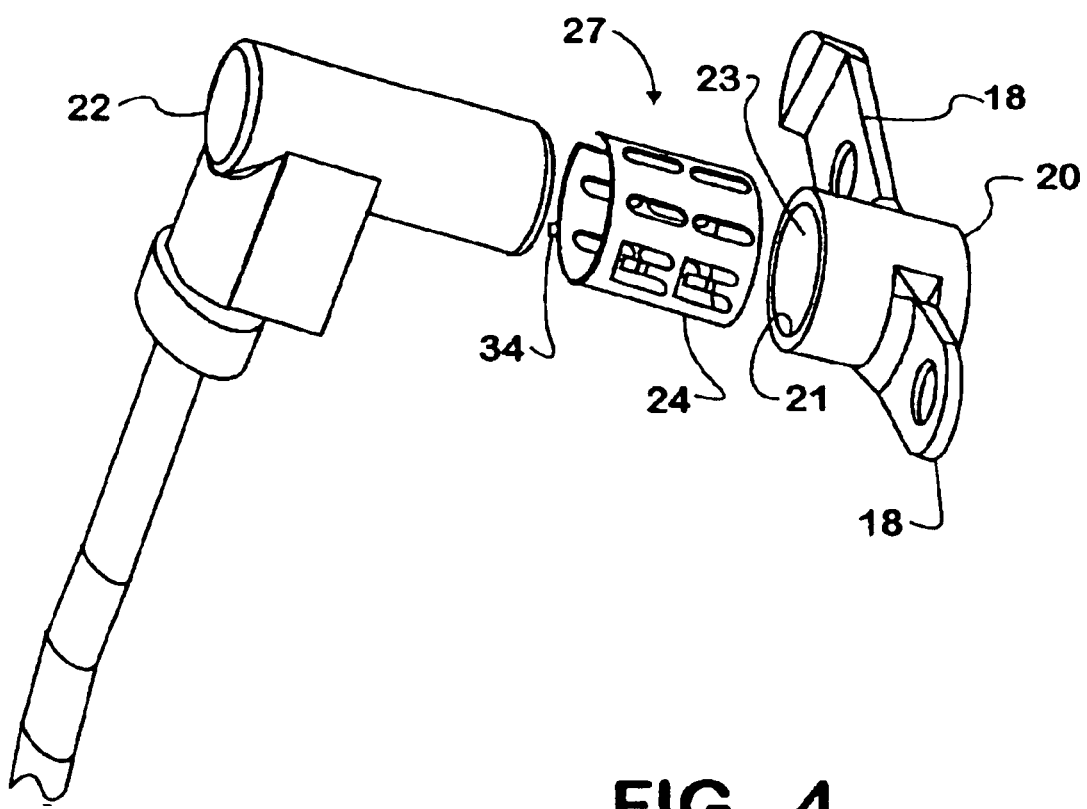
FIG. 4 is an exploded view of a sensor positioning subassembly.
Figure 5A:
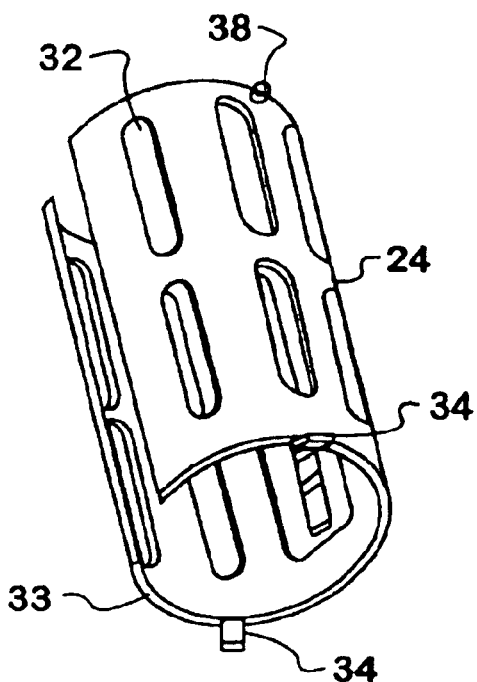
FIGS. 5A–D are views of a bushing used in the sensor positioning subassembly.
Figure 5B:
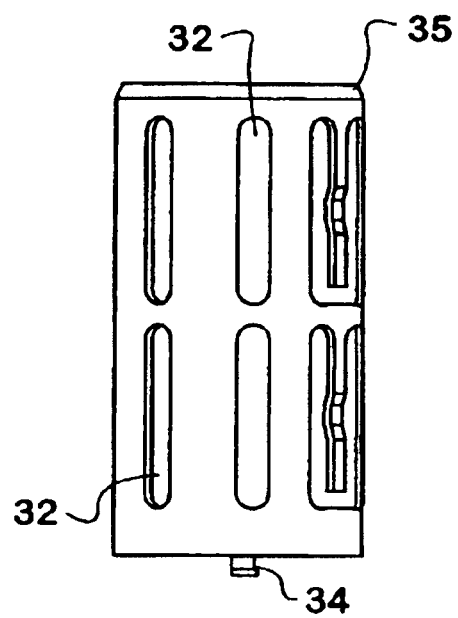
Figure 5C:
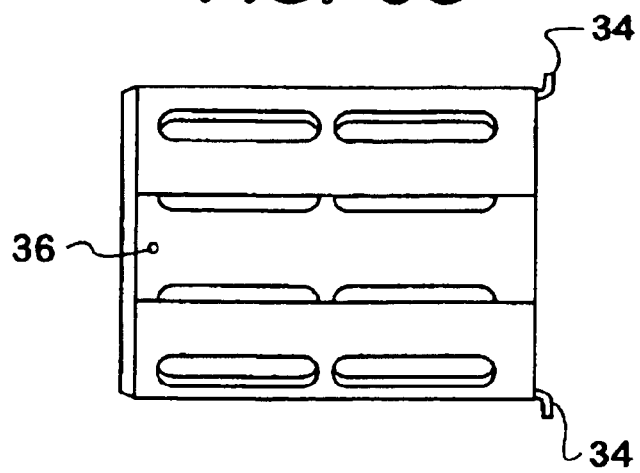
Figure 5D:
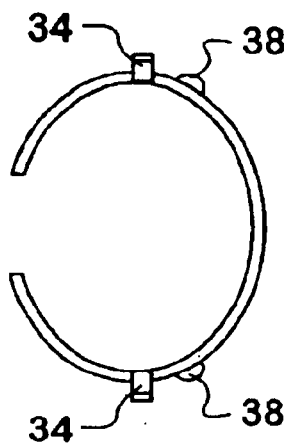

FIG. 1 is a perspective view of a mounting element 10 of a type commonly employed on trucks. Mounting element 10 has integral disk brake caliper supports 12 which extend from the bottom of the plate and a pair of wing flanges 16 which project above an interior ring 14. Attached to the wing flanges 16 is a bracket 20. Bracket 20 has flanges 18 extending from either side of the bracket to align with wing flanges 16. Interior ring 14 defines a circular opening through the center of mounting plate 10 through which a vehicle axle may extend (not shown). A wheel (not shown) may be mounted on the axle.

FIG. 2 illustrates the preferred positional relationship of the sensor housing 22 to a rotating disk 26 on which are mounted a plurality of flux focusing ridges 28. As illustrated in FIG. 3, ridges 28 alternate with gaps 30 along the exterior perimeter of rotating disk 26. Disk 26 is mounted on the wheel assembly (not shown) for a vehicle so that it rotates with the wheel. As long as disk 26 is rotating, sensor housing 22 is exposed to an alternating sequence of ridges and gaps passing in front of it and the sensor generates an alternating signal as a result. Interruption in the rotation of disk 26 locks the signal level, indicating a skid.

The gap between sensor housing 22 and ridges 28 should be reduced to the reasonable limit of mechanical tolerance to reduce magnetic flux leakage between the ridges and the sensor housing. Since the precise position of the ridges is set only after the wheel carrying disk 26 has been mounted on a vehicle, the position of the sensor is best set after the wheel has been installed. Unfortunately, the gap between sensor housing 22 and ridges 28 is not readily observed after installation. The solution has been to position sensor housing 22 in a fixture without retaining screws so that the installation of the wheel forces the sensor housing 26 back to an acceptable position. Sensor housing 22 is fully inserted through a bracket 20 until a movement limit is found. The sensor housing 22 is frictionally held in bracket 20 by a bushing 24 pressed between the sensor housing and an interior wall of a hole through the bracket. The friction between bushing 24 and sensor housing 22, at a minimum, should prevent inadvertent movement of the sensor housing due to road shock and similar environmental factors, but not so great as to prevent displacement of the sensor housing by impingement of the ridges 28 during installation of a wheel. Bushing 24 best fills this functions when it is positioned to completely line the interior wall of bracket 20.

FIG. 4 is an exploded view of a sensor subassembly 27 comprising a sensor housing 22, a cylindrical bushing 24 and a mounting bracket 20. Mounting bracket 20 an aperture or includes bore 21 defined by a cylindrical interior surface 23. To assemble the subassembly, bushing 24 is inserted into the bore 21 until retaining flanges 34 impinge against the body of the bracket. Thereafter the cylindrical portion of sensor housing 22 is inserted into the bore 21 within bushing 24 until a natural stop on the body of the sensor housing is reached. The mounting of a wheel should push sensor housing 22 back to the appropriate position for use in skid detection. Unfortunately, in prior art applications, the bushing can be pushed partly out of the bracket along with the sensor housing. In such cases the expected friction between the bushing and sensor housing 22 is not obtained, and the sensor housing is prone to undesired movement in reaction to road shock.

FIGS. 5A–D illustrate a preferred embodiment of bushing 24 in accordance with the invention which prevents displacement of the bushing during positioning of the sensor housing 22. Bushing 24 is fabricated from a rectangular piece of spring metal, and has a plurality of slots 32 running the length of the sheet. The sheet is rolled into a cylindrical form on an axis parallel to the direction of elongation of the slots 32. Extending from an edge of the sheet forming one end of the cylindrical form of bushing 24 are a pair of retaining flanges 34 which prevent over insertion of the bushing into a cylindrical opening. Adjacent the opposite, insertion end 35 of the cylindrical form of bushing 24 are a pair of dimples or outdents 38. Outdents 38 press against the interior cylindrical surface 23 during insertion of bushing 24 and expand outwardly after full insertion of bushing into the aperture 21. Insertion end 35 is beveled down from the outside surface to the bushing 24's inside surface to allow easier insertion of the bushing into a tube. Outdents 38 are sized to allow bushing 24 to be pushed through a cylindrical opening, but to provide substantial resistance to its withdrawal once pushed passed the opposite open end of the cylindrical opening. On a bushing having a outside diameter of 0.807", outdents of 0.023" in height are nominal.

Additionally, if desired, an indent 36 may be placed on the inside surface bushing of 24 to impinge against sensor housing 22. Such an indent improves control the frictional coefficient between sensor housing 22 and bushing 24.

The bushing of the present invention retains its proper position in a sensor mounting bracket after full insertion. Proper positioning of the bushing better maintains the minimum required retained force on a sensor to hold the position of a sensor. A comparison of results obtained from using the prior art bushing and the bushing of the present invention in comparable applications illustrates this.

TABLE 1

Push Force to Displace Prior Art Bushing

| | |
|---|---|
| Mean | 27.5811 lbs. |
| St. Dev. | 5.0841 lbs. |
| Minimum | 11.0 lbs. |
| 1st Quartile | 24.0 lbs. |
| Median | 27.0 lbs. |
| 3rd Quartile | 30.0 lbs. |
| Maximum | 45.0 lbs. |

TABLE 2

Push Force to Displace Bushing of Present Invention

| | |
|---|---|
| Mean | 35.6625 lbs. |
| St. Dev. | 6.5343 lbs. |
| Minimum | 23.2 lbs. |
| 1st Quartile | 30.5 lbs. |
| Median | 35.65 lbs. |
| 3rd Quartile | 38.9 lbs. |
| Maximum | 62.6 lbs. |

While the invention is shown in only one of its forms, it is not thus limited but is susceptible to various changes and modifications without departing from the spirit and scope of the invention.

What is claimed is:

1. A bushing for disposition in a cylindrical aperture defined by a surface, the bushing providing a bearing surface for a cylindrical probe to be inserted into the cylindrical aperture with the bearing surface providing a consistent reactive force to the cylindrical probe resisting in and out movement of the cylindrical probe to and from the cylindrical aperture, the bushing comprising:

a sheet of spring metal, formed into a substantially cylindrical shape;

a pair of outwardly projecting retaining brackets extending from a first edge of the sheet and positioned at one end of the substantially cylindrical shape;

an inwardly oriented dimple in the sheet; and a pair of outwardly projecting dimples in the sheet near the edge of the sheet opposite the first edge, the dimples being sized to allow insertion of the bushing into a cylindrical aperture but operating to resist extraction for the bushing after passing completely through the cylindrical aperture.

2. The bushing of claim 1, further comprising:

a plurality of slots in the sheet oriented to parallel and to be elongated in the direction of an imaginary central axis of the cylindrical form of the sheet.

* * * * *